R. G. RATTERMAN.
AUTOMOBILE BUMPER.
APPLICATION FILED APR. 6, 1921.

1,396,057.

Patented Nov. 8, 1921.

Inventor
Ray G. Ratterman,
By
Attorneys

UNITED STATES PATENT OFFICE.

RAY G. RATTERMAN, OF LOUISVILLE, KENTUCKY, ASSIGNOR TO DOW WIRE AND IRON WORKS, OF LOUISVILLE, KENTUCKY, A CORPORATION OF KENTUCKY.

AUTOMOBILE-BUMPER.

1,396,057.  Specification of Letters Patent.  Patented Nov. 8, 1921.

Application filed April 6, 1921. Serial No. 459,008.

*To all whom it may concern:*

Be it known that I, RAY G. RATTERMAN, citizen of the United States, residing at Louisville, in the county of Jefferson and State of Kentucky, have invented certain new and useful Improvements in Automobile-Bumpers, of which the following is a specification.

This invention relates to automobile bumpers, but more particularly to a bumper for use on a certain well known automobile, and the invention has for its object to provide a device of this class which can be quickly and readily applied to a machine without the aid of special tools and without the drilling of holes.

With this object in view, the invention consists of the novel construction of the bumper and particularly in the construction of the supporting arms, and in the connections employed.

Referring to the accompanying drawing.

Like numerals of reference indicate the same parts throughout the two figures, in which.

Figure 1:
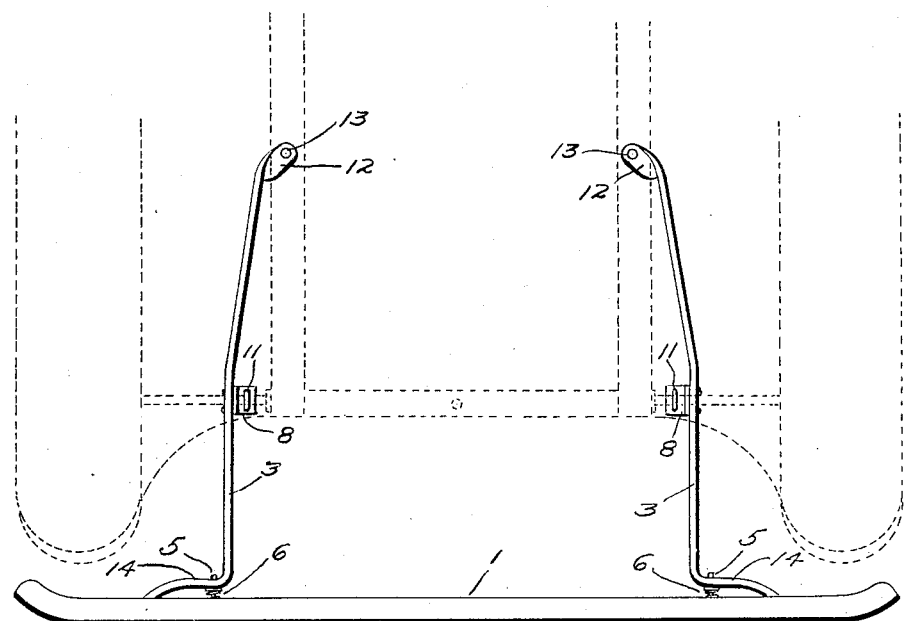
Figure 1 is a plan view of the bumper illustrating its position on an automobile.
Figure 2:
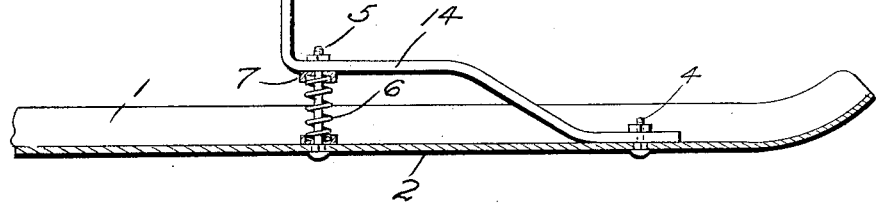
Fig. 2 is a horizontal fragmentary view through the bumper-bar.

1 indicates the bumper, which comprises the bar 2, preferably a channel bar, and the supporting arms 3.

As shown, the arms 3 are secured to the bar 2 by through bolts 4, and are again connected to said bar by through bolts 5 passing also through stiff coil springs 6; the ends of which springs are set in caps 7. From the springs 6, the two arms extend rearwardly substantially parallel to each other, and at a predetermined point, intermediate the rearwardly extending portions, is an angle-plate or bracket 8, permanently secured to each arm 3. The horizontal portions 9 of the plates or brackets 8 are each provided with two perforations 10 to receive a U bolt 11. The rear end portion 12 of each arm 3 is bent from its normal vertical plane to a horizontal plane, and are each provided with a bolt-hole 13 to coincide with an existing hole formed in the frame of the automobile.

Having thus described the several parts of the invention, its operation is as follows:

The portions 14 of the arms 3 lying directly behind the channel-bar 2 are resilient, and as shock is received on the bar 2, the same is resisted by the resilient portions 14 of the arms and also by the coil springs 6 which compress under shock and thus relieve and protect the vehicle from injury.

To apply the bumper to a machine, the U bolts 11 are passed around the front fender arms of the fenders, and the end 12 of each arm 3 is bolted on the frame of the machine in position shown in Fig. 1.

This construction of the arms 3 and the fastenings provided, render the rearwardly extending portions of the said arms extremely strong and rigid and free from rattling and vibration, while the resilient connections between the arms 3 and the bar 2, provide for the efficient absorption of shocks by the said bar without injury to the machine or to the device.

What I claim as new and desire to secure by Letters Patent of the United States, is:

A bumper for automobiles including a transverse bumper-bar, a pair of supporting arms, each of which has a resilient portion lying directly behind the said bar, a fastening for securing the outer end of each resilient portion of the arms to the transverse bumper-bar, a coil spring disposed between each resilient portion of the arms and the bumper-bar, the said arms being each provided with a rearwardly extending portion substantially parallel with each other, a fastening carried on each rearwardly extending portion and adapted to engage a part of the automobile, the rear end portions of the arms being each provided with means to receive a fastening, substantially as described and for the purposes set forth.

In testimony whereof I affix my signature.

RAY G. RATTERMAN.